United States Patent
Doganata et al.

(10) Patent No.: US 10,902,198 B2
(45) Date of Patent: Jan. 26, 2021

(54) GENERATING RULES FOR AUTOMATED TEXT ANNOTATION

(71) Applicant: INTERNATIONAL BUSINESS MACHINES CORPORATION, Armonk, NY (US)

(72) Inventors: Yurdaer N. Doganata, Chestnut Ridge, NY (US); Roberto Delima, Apex, NC (US); Aysu Ezen Can, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

(21) Appl. No.: 16/203,903

(22) Filed: Nov. 29, 2018

(65) Prior Publication Data
US 2020/0175104 A1 Jun. 4, 2020

(51) Int. Cl.
G06F 40/205 (2020.01)
G10L 15/18 (2013.01)
G06F 40/30 (2020.01)
G06F 40/169 (2020.01)

(52) U.S. Cl.
CPC .......... G06F 40/205 (2020.01); G06F 40/169 (2020.01); G06F 40/30 (2020.01); G10L 15/1815 (2013.01)

(58) Field of Classification Search
None
See application file for complete search history.

(56) References Cited

U.S. PATENT DOCUMENTS

| 7,765,097 | B1 | 7/2010 | Yu et al. |
| 9,244,909 | B2 | 1/2016 | Ng Tari et al. |
| 9,569,733 | B2 | 2/2017 | Nassar et al. |
| 9,588,961 | B2 | 3/2017 | Bruno et al. |
| 10,146,994 | B2 | 12/2018 | Jin et al. |
| 10,394,946 | B2 | 8/2019 | Miller et al. |
| 2006/0277028 | A1* | 12/2006 | Chen ............... G06F 40/216 704/4 |
| 2013/0339005 | A1* | 12/2013 | Zhang ............... G16B 40/00 704/9 |
| 2015/0378984 | A1 | 12/2015 | Ateya et al. |

(Continued)

OTHER PUBLICATIONS

Guodong, Z. et al., "Tree kernel-based semantic relation extraction with rich syntactic and semantic information," [online] Information Sciences, vol. 180, No. 8, Apr. 15, 2010, pp. 1313-1325, retrieved from Internet: <http://nlp.suda.edu.cn/~gdzhou/publication/zhougd2010_INS_ContextSensitiveTreeKernelforRelationExtraction.pdf>.

(Continued)

Primary Examiner — Abul K Azad
(74) Attorney, Agent, or Firm — Cuenot, Forsythe & Kim, LLC

(57) ABSTRACT

Natural language text and annotated text can be received. The annotated text can specify at least one anchor and at least one trigger contained in the natural language text and indicate a correspondence between the anchor and the trigger. The natural language text, the annotated text and at least one parse tree generated from the natural language text can be processed. Based on the processing, at least one natural language processing rule can be generated and output. The natural language processing rule can be configured to be executed by a processor to process other natural language text.

20 Claims, 11 Drawing Sheets

(56) References Cited

U.S. PATENT DOCUMENTS

| | | | |
|---|---|---|---|
| 2016/0350359 | A1 | 12/2016 | Kim et al. |
| 2017/0052950 | A1* | 2/2017 | Danielyan ............. G06F 40/177 |
| 2017/0075904 | A1 | 3/2017 | Hedges |
| 2018/0293227 | A1* | 10/2018 | Guo .................... G06F 16/3344 |
| 2018/0365226 | A1 | 12/2018 | Ezen Can et al. |
| 2019/0121841 | A1* | 4/2019 | Sbodio ................. G06F 16/358 |

OTHER PUBLICATIONS

Qian, L., et al., "Tree Kernel-Based Semantic Relation Extraction Using Unified Dynamic Relation Tree," ALPIT '08. International Conference on Advanced Language Processing and Web Information Technology, 2008, 6 pg., retrieved from Internet: <http://nlp.suda.edu.cn/~qianlonghua/papers/20.pdf>.

Mintz, M. et al., "Distant supervision for relation extraction without labeled data," ACL '09 Proc. of the Joint Conf. of the 47th Annual Meeting of the ACL and the 4th Int'l. Joint Conf. on Natural Language Processing of the AFNLP: vol. 2-vol. 2, pp. 1003-1011, retrieved from Internet: <https://nlp.stanford.edu/pubs/mintz09.pdf>.

J. Fan, A. Kalyanpur, D. C. Gondek, and D. A. Ferrucci, "Automatic knowledge extraction from documents," IBM Journal of Research and Development (vol. 56, Issue: 3.4, May-Jun. 2012), pp. 5:1-5:10. Retrieved from Internet using: http://brenocon.com/watson_special_issue/05%20automatic%20knowledge%20extration.pdf.

Abdel-Moneim, W.T. et al., "Clinical Relationships Extraction Techniques from Patient Narratives," arXiv preprint arXiv:1306.5170 (2013), 15pg.

Dan, A. et al., "Determining Entity Relationships with Weighted Parse Tree Fragmentation," [online] IP.Com Prior Art Database, Jan. 22, 2017, retrieved from the Internet: <https://priorart.ip.com/IPCOM/000248923>, 5 pg.

Jindal, P. et al., "Extraction of events and temporal expressions from clinical narratives," Journal of Biomedical Informatics, vol. 46, p. S13-S19, Dec. 1, 2013, 7 pg.

Roberts, A. et al., "Extracting clinical relationships from patient narratives," Proceedings of the Workshop on Current Trends in Biomedical Natural Language Processing. Association for Computational Linguistics, 2008, 9 pg.

* cited by examiner

1100

```
┌─────────────────────────────────────────────────────────────────────────┐
│ Receive first natural language text and first annotated text, the first │
│ annotated text specifying at least one anchor and at least one trigger  │
│ contained in the first natural language text and indicating a           │
│ correspondence between the anchor and the trigger                       │
│                                  1102                                    │
└─────────────────────────────────────────────────────────────────────────┘
                                    │
                                    ▼
┌─────────────────────────────────────────────────────────────────────────┐
│ Process the first natural language text, the first annotated text and   │
│ at least one parse tree generated from the first natural language text  │
│ and, based on the processing, generate at least one natural language    │
│ processing rule, the natural language processing rule configured to be  │
│ executed by a processor to process at least a second natural language   │
│ text                                                                     │
│                                  1104                                    │
└─────────────────────────────────────────────────────────────────────────┘
                                    │
                                    ▼
┌─────────────────────────────────────────────────────────────────────────┐
│         Output the at least one natural language processing rule         │
│                                  1106                                    │
└─────────────────────────────────────────────────────────────────────────┘
```

FIG. 11

GENERATING RULES FOR AUTOMATED TEXT ANNOTATION

BACKGROUND

The present invention relates to natural language processing, and more specifically, to automatically generating computer implemented rules for processing natural language text.

Physicians often dictate into a voice recorder medical information pertaining to patients, for example during medical examinations. Such dictations typically are manually transcribed into text by a medical transcriptionist to generate medical reports, though speech recognition also may be used to automatically transcribe the dictated information into text. Regardless, the text typically is in an unstructured format, which is not the most efficient way to store the data. Moreover, in comparison to structured data, analysis by medical personnel of unstructured data is more time consuming.

SUMMARY

A method includes receiving a first natural language text and a first annotated text, the first annotated text specifying at least one anchor and at least one trigger contained in the first natural language text and indicating a correspondence between the anchor and the trigger. The method also can include processing, using a processor, the first natural language text, the first annotated text and at least one parse tree generated from the first natural language text and, based on the processing, generating at least one natural language processing rule, the natural language processing rule configured to be executed by at least a second processor to process at least a second natural language text. The method also can include outputting the at least one natural language processing rule.

A system includes a processor programmed to initiate executable operations. The executable operations include receiving a first natural language text and a first annotated text, the first annotated text specifying at least one anchor and at least one trigger contained in the first natural language text and indicating a correspondence between the anchor and the trigger. The executable operations also can include processing the first natural language text, the first annotated text and at least one parse tree generated from the first natural language text and, based on the processing, generating at least one natural language processing rule, the natural language processing rule configured to be executed by at least a second processor to process at least a second natural language text. The executable operations also can include outputting the at least one natural language processing rule.

A computer program product includes a computer readable storage medium having program code stored thereon. The program code is executable by a data processing system comprising a first processor to initiate operations. The operations include receiving a first natural language text and a first annotated text, the first annotated text specifying at least one anchor and at least one trigger contained in the first natural language text and indicating a correspondence between the anchor and the trigger. The operations also can include processing the first natural language text, the first annotated text and at least one parse tree generated from the first natural language text and, based on the processing, generating at least one natural language processing rule, the natural language processing rule configured to be executed by at least a second processor to process at least a second natural language text. The operations also can include outputting the at least one natural language processing rule.

BRIEF DESCRIPTION OF THE DRAWINGS

FIG. 11 is a flowchart illustrating an example of a method of generating a rule for annotating natural language text.

DETAILED DESCRIPTION

Figure 1:
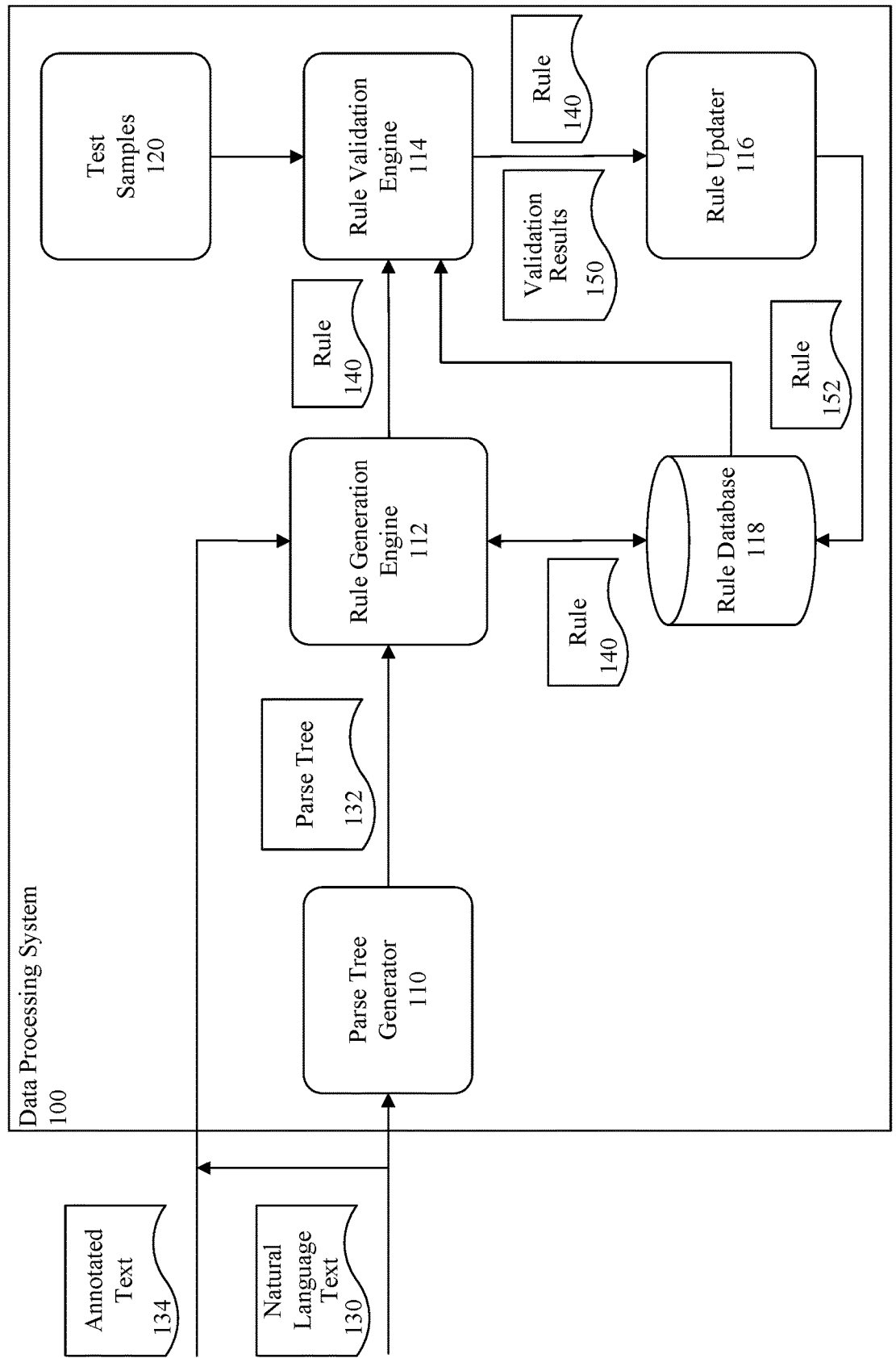
FIG. 1 is a block diagram illustrating an example of a data processing system.

This disclosure relates to data processing systems and, more particularly, to automatically generating computer implemented rules for processing natural language text.

In accordance with the inventive arrangements disclosed herein, a data processing system can automatically generate natural language processing rules (hereinafter "rules") configured to be executed to process natural language text. The rules can be configured to be executed by a processor to identify anchors and triggers contained in the natural language, as well as identify correspondences between the anchors and triggers. The rules can, for example, indicate which anchors correspond to which triggers. Accordingly, the rules can be used to automatically annotate the natural language text to indicate the anchors and triggers, and indicate which anchors correspond to which triggers.

To generate the rules, the data processing system can receive natural language text for which the anchors, triggers and their relationships are known. In this regard, the data processing system also can receive annotated text that indicates the anchors, triggers and their relationships. Further, the data processing system can receive a parse tree generated from the natural language text or process the natural language text to generate the parse tree. The data processing system can analyze the structure of the parse tree, including semantic relationships between elements contained in the parse tree. For instance, the data processing system can, based on the annotated text, identify anchors and triggers in the parse tree that correspond to one another, and determine their semantic relationships. Based on determined semantic relationships between the anchors and triggers, the data processing system can generate heuristics, which are high-level expressions of natural language text processing rules. The data processing system can generate the rules in accordance with the heuristics.

Semantic patterns contained in natural language text sometimes are difficult to identify. Nonetheless, the data processing system can efficiently identify semantic relationships between anchors and triggers contained parse trees with a high level of accuracy and efficiency. Accordingly, the arrangements described herein improve on existing natural language text processing technology.

Several definitions that apply throughout this document now will be presented.

As defined herein, the term "natural language text" means text written or spoken by a human being in a human language that does not have a pre-defined data model and/or is not organized in a pre-defined manner.

As defined herein, the term "human language" means a language spoken or written by human beings that is not a computer programming language.

As defined herein, the term "parse tree" means an ordered data structure that represents a syntactic structure of a text string in a hierarchical manner.

As defined herein, the term "trigger" means a description of a cause or symptom of an ailment.

As defined herein, the term "anchor" means a measurement pertaining to a trigger.

As defined herein, the term "heuristic" means a high-level expression of a natural language text processing rule.

As defined herein, the term "natural language text processing rule" means a rule used during machine processing of natural language text in order to create at least one annotation for the natural language text, the at least one annotation identifying at least one trigger and at least one anchor contained in the natural language text, and the at least one annotation indicating a correspondence between the at least one trigger and the at least one anchor. A "natural language text processing rule" may be referred to herein as a "rule."

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

FIG. 1 is a block diagram illustrating an example of a data processing system (hereinafter "system") 100. The system can include a parse tree generator 110, a rule generation engine 112, a rule validation engine 114, a rule updater 116, a rule database 118, and test samples 120.

In operation, natural language text 130 can be input to the parse tree generator 110. The natural language text 130 can be unstructured text or semi-structured text. For example, the natural language text 130 can be a patient narrative, spoken or written by a medical professional, that includes one or more full and/or partial sentences as one or more text strings. In the case that the patient narrative is generated using spoken utterances, the spoken utterances can be converted to the natural language text 130 using speech recognition and/or transcription. In another example, the natural language text 130 can be a sample patient narrative. The natural language text 130 can include triggers and anchors. For instance, consider the following patient narrative: "Physical exam showed right breast mass measuring approximately 7.5×7 cm, 1.5 cm right axillary node." In this example, "mass" and "right axillary node" are triggers, and "7.5×7 cm" and "1.5 cm" are anchors.

Figure 2:
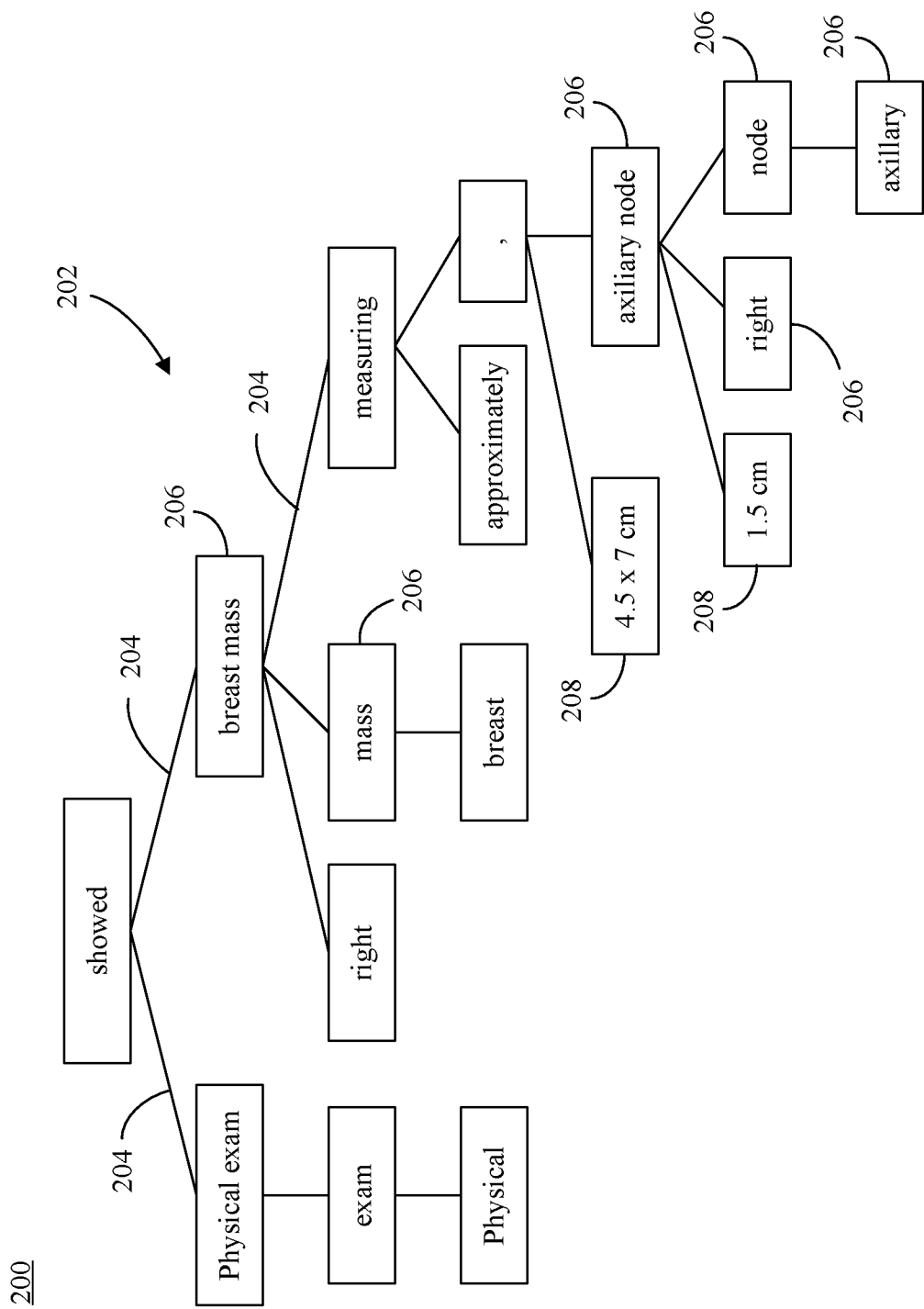
FIG. 2 depicts an example of a parse tree generated from natural language text.

The parse tree generator 110 can parse text from the natural language text 130 and generate a parse tree 132 using techniques known to those skilled in the art. FIG. 2 depicts an example parse tree 200 which the parse tree generator 110 can generate from the above example patient narrative. The parse tree 200 can indicate the syntactic structure (e.g., linguistic structure) of the natural language text in a hierarchical manner, indicating parent/child relationships between various elements 202 (e.g., words, symbols, phrases, measurements, etc.) of the natural language text. For example, the parse tree 200 can include various connectors 204 that connect parent elements with their child elements, thus indicating how the natural language text is semantically parsed. The elements 202 can include, among various other words/terms/phrases, the triggers 206 and anchors 208 contained in the natural language text 130. It should be noted that in some cases triggers 206 and/or anchors 208 may include more than one word. Thus, a particular trigger 206 and/or anchor 208 may be represented by more than one node in the parse tree 200.

In an arrangement, the parse tree generator 110 can communicate the parse tree 132 to the rule generation engine 112. In another arrangement, the parse tree generator 110 can store the parse tree 132 in a manner that associates the parse tree 132 with the natural language text 130. For example, the parse tree generator 110 can create a link between a file containing the natural language text 130 and a file containing the parse tree 132.

The natural language text 130, the parse tree 132, and an annotated version of the natural language text (hereinafter "Annotated text") 134 can be input to the rule generation engine 112. The annotated text 134 can include annotations that indicate the triggers and anchors contained in the natural language text 130, and an expected output by applying a natural language processing rule (hereinafter "rule") to the natural language text 130. For example, continuing with the previous example, the annotations contained in the annotated text 134 can identify the term "mass" as a trigger and the term "7.5×7 cm" as an anchor to which that trigger corresponds. The annotations contained in the annotated text 134 also can identify the term "right axillary node" as a trigger and the term "1.5 cm" as an anchor to which that trigger corresponds.

By way of example, natural language processing (NLP) can be applied to the natural language text 130 to generate the annotated text 134, for example by a NLP system (not shown). The NLP can recognize specific surface forms contained in the natural language text 130 that match certain semantic classifications, and normalize the terms to a specific meaning. For instance, terms such as "tumor," "foci," "mass" and "lesions" are known to be types of tumors and the NLP can semantically annotate such terms as a "tumor trigger." Multi-dimensional numbers followed by a unit, such as "cm," are known to be measurements and the NLP can semantically annotate such numbers as "anchors." The NLP process can classify the relationships between given anchor-trigger pairs. In the above examples, if it is determined that the anchor (e.g., a measurement) is related to a trigger (e.g., a tumor trigger), then the relationship for that anchor/trigger pair can identify the anchor as a "tumor size," and a "tumor size" annotation is can be produced by the NLP process over that span.

The rule generation engine 112 can analyze the parse tree 132. Such analysis can include analyzing the structure of the parse tree 132 and determining semantic relationships between the various elements of the parse tree 132. In illustration, using the analysis, the rule generation engine 112 can identify parent/child relationships between elements, sibling relationships between elements, path lengths between elements (e.g., a number of connectors between elements), etc. Further, the analysis can identify, in the parse tree 132, sentence fragments and determine how the sentence fragments are split. For instance, the heuristic analysis can identify conjunctions (e.g., words such as "and," "because," "but," "for," "if," "or," "when," etc.) and punctuation marks that connect sentence fragments. The analysis also can determine relationships between elements that are contained in different sentence fragments.

Moreover, using the annotated text 134, the rule generation engine 112 can identify in the parse tree 132 the anchors and triggers, which are contained in natural language text 130 and represented as elements of the parse tree 132, and determine the semantic relationships between the anchors and triggers based on the analysis of the parse tree 200. Further, based on the semantic relationships, the rule generation engine 112 can classify each of the anchors and triggers.

In an aspect of the present arrangements, the rule generation engine 112 can be configured to apply feature constraints, container constraints and/or scopes to the analysis of the parse tree 132. A feature can be a property, for example a date, a time, etc. A feature constraint can be a constraint on the property, for example to only consider numeric values, only look elements containing certain words, etc. Various text in the natural language text 130 can belong to one or more containers, for example words, phrases, sentences, paragraphs, sections, documents, etc. A container constraint can be used to limit the portions of the natural language text 130, indicated in the parse tree 132, that are analyzed. For example, a container constraint can be "section must be titled "physical examination." If such container constraint is applied to the analysis, the rule generation engine 112 need only analyze parse tree elements for text contained in that section of the natural language text 130. A scope can specify a level of analysis. For example, a scope can specify to analyze the parse tree elements at a sentence level, at a paragraph level, at a section level, etc.

Based on the determined anchors and triggers and their correspondences (e.g., their semantic relationships), the rule generation engine 112 can automatically determine whether one or more existing rules contained in the rule database 118 are applicable to the natural language text 130. In illustration, the rule generation engine 112 can determine, for each pair of triggers and anchors that are determined to be related, whether an existing rule from the rule database 118, when applied to the natural language text 130, accurately identifies the anchor and trigger and identifies the trigger corresponds to the anchor. For example, assume the annotations in the annotated text 134 indicate that the term "mass" is a trigger, the term "7.5×7 cm" is an anchor, and that trigger corresponds to that anchor. Further assume that the annotations indicate the term "right axillary node" is a trigger, the term "1.5 cm" as an anchor, trigger corresponds to that anchor. The rule generation engine 112 can determine whether an existing rule identifies the term "mass" as being a trigger, identifies the term "7.5×7 cm" as being an anchor, and determines that the trigger "mass" corresponds to the anchor "7.5×7 cm." Further, the rule generation engine 112 can determine whether an existing rule identifies the term "right axillary node" as being a trigger, identifies the term "1.5 cm" as being an anchor, and determines that the trigger "right axillary node" corresponds to the anchor "1.5 cm."

For each anchor/trigger pair for which the rule generation engine 112 determines that there is not an existing rule that identifies the trigger, identifies the anchor, and identifies their correspondence, the rule generation engine 112 can generate a new rule that does so. To generate the rule, the rule generation can generate a heuristic for the rule, which is a high-level expression of the rule, based on the identified semantic relationship between the trigger and the anchor determined during analysis of the parse tree 132. For example, if the anchor is a child of a trigger, the high-level rule can specify that if an anchor is a child of a trigger, then that trigger corresponds to that anchor. The rule generation engine 112 can automatically generate, from the heuristic, the rule as computer program code. Automatically generating computer program code from high-level expressions, such as heuristics, is known in the art.

Figure 3:
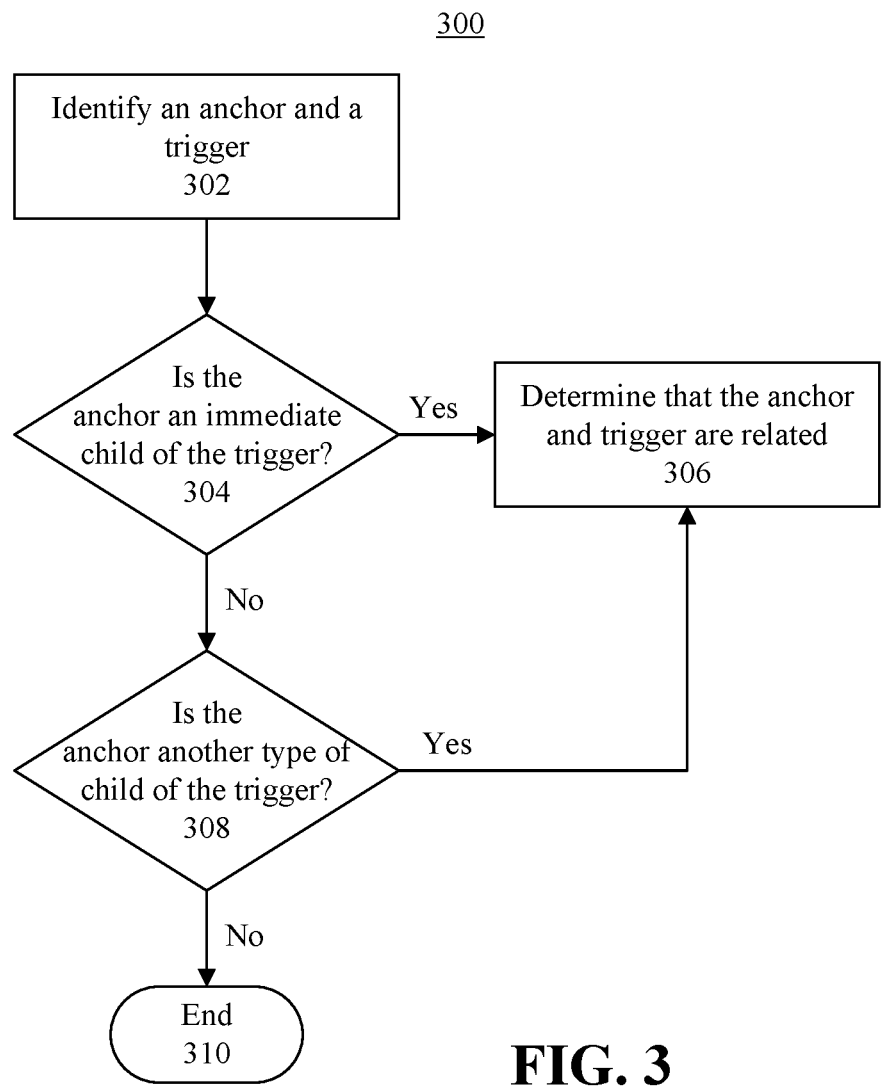
FIG. 3 is a flowchart representing a process defined by a heuristic for a natural language text processing rule.

FIG. 3 is a flowchart representing a process 300 defined by a heuristic for a natural language text processing rule which can be generated by the rule generation engine 112. The heuristic can be generated based on the previously described example for which the parse tree 200 is depicted in FIG. 2. The rule generation engine 112 can generate a rule based on the heuristic. At step 302, an anchor and a trigger are identified. At decision box 304, a determination is made as to whether the anchor is an immediate child of the trigger. If so, at step 306 a determination is made that the anchor and trigger are related. Referring again to decision box 304, if the anchor is not an immediate child of the trigger, the process proceeds to decision box 308. At decision box 308, a determination is made as to whether the anchor is another type of child (e.g., a grandchild) of the trigger, which can be determined based on the path length between the anchor and trigger elements in the parse tree 200. If so, at step 306 a determination is made that the anchor and trigger are related. If not, the process can end at step 310.

Referring again to FIG. 1, the rule generation engine 112 can communicate the newly generated rule 140 to the rule validation engine 114. The rule validation engine 114 can validate the rule 140 by applying the rule 140 to a plurality of natural language text test samples (test samples) 120, for which anchor and trigger semantic relationships are known, and generate corresponding validation results 150 based on the validation. For example, the anchor/trigger semantic relationships can be specified by annotations contained in annotated text for the respective test samples 120. The validation can include determining which, if any, semantic relationships in the test samples 120 the rule 140 accurately identifies and which, if any, semantic relationships in the test samples 120 the rule 140 inaccurately identifies. If the rule 140 inaccurately identifies any anchor/trigger semantic relationships, the rule validation engine 114 can generate in the validation results 150 a listing of the test samples 120 in which those anchor/trigger semantic relationships are contained and identify the anchor/trigger semantic relationships in those test samples 120. If the rule accurately identifies any anchor/trigger semantic relationships, the rule validation engine 114 can generate in the validation results 150 a listing of the test samples 120 in which those anchor/trigger semantic relationships are contained and identify the anchor/trigger semantic relationships in those test samples 120. Further, if the rule 140 does not identify any anchor/trigger semantic relationships, the rule validation engine 114 can record such result in the validation results 150.

The rule validation engine 114 can communicate the rule 140 and the validation results 150 to the rule updater 116. The rule updater 116 can be used by a user, for example a rule validation expert, to evaluate the validation results 150 and, if necessary, update the rule 140 to generate an updated rule 152. If an updated rule 152 is generated, the rule updater 116 can communicate the rule 152 to the rule database 118 to replace the rule 140.

Figure 4:
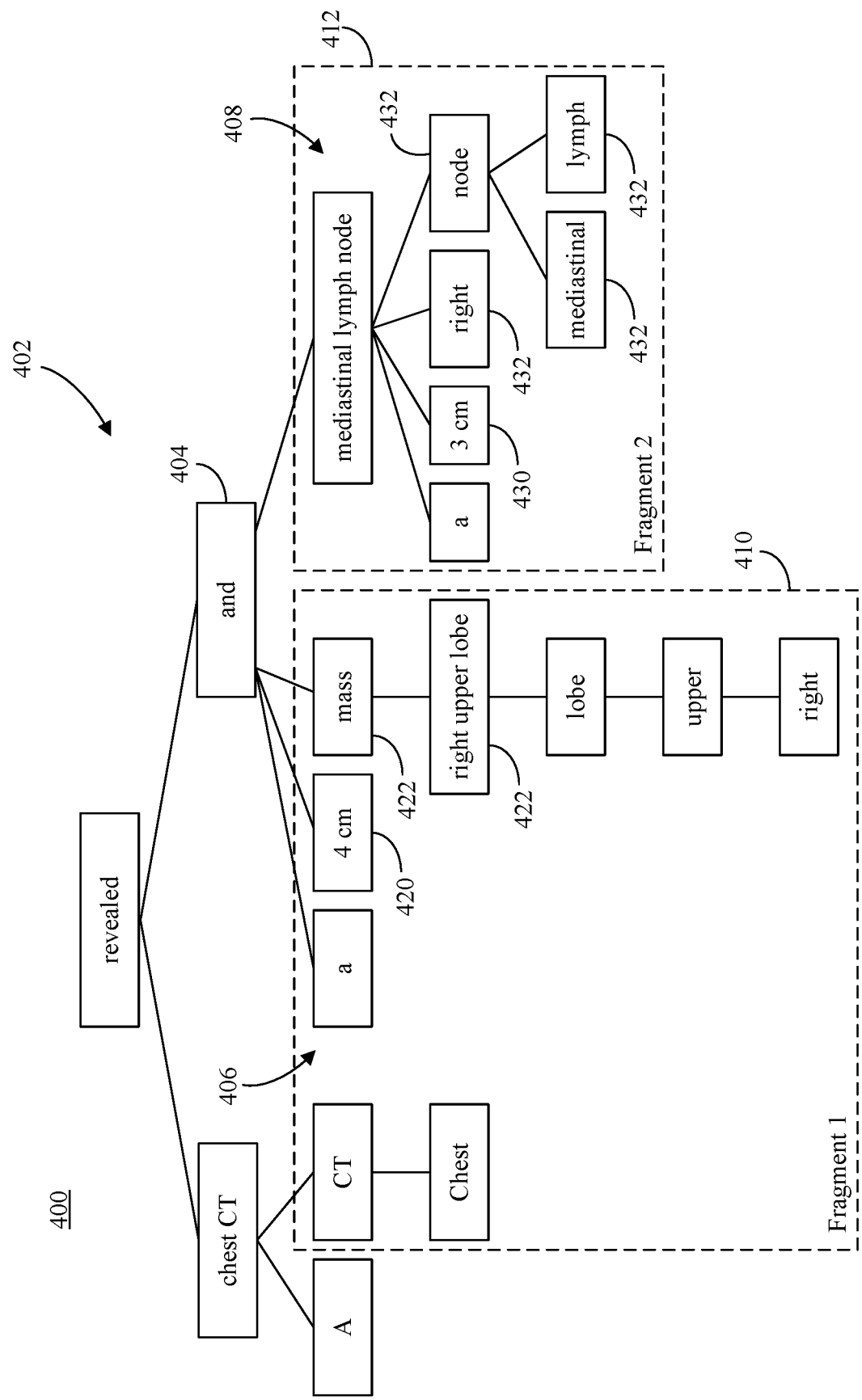
FIG. 4 depicts another example of a parse tree generated from natural language text.

FIG. 4 depicts another example of a parse tree 400 including elements 402 generated from natural language text. During analysis of the parse tree 400, the rule generation engine 112 can identify a conjunction 404 ("and") in the parse tree. Based on the location of conjunction 404 in the parse tree 400 and elements 406, 408 contained in the natural language text on either side of the conjunction 404, the rule generation engine 112 can identify sentence fragments 410, 412. The sentence fragment 410 can contain the elements 406 and the sentence fragment 412 can contain the elements 408.

The sentence fragment 410 can include an anchor 420 and a trigger 422 in a sibling semantic relationship. Similarly, the sentence fragment 412 can include an anchor 430 and a trigger 432 in a sibling semantic relationship. Using the annotated text corresponding to the natural language text, the rule generation engine 112 can identify the anchors 420, 430 and triggers 422, 432 in the parse tree 400, determine that the trigger 422 corresponds to the anchor 420, and determine that the trigger 432 corresponds to the anchor 430. Further, the rule generation engine 112 can determine that the anchor 420 and trigger 422 have sibling semantic relationship in the fragment 410 and that the anchor 430 and trigger 432 have sibling semantic relationship in the fragment 412. Based on these determinations, the rule generation engine 112 can automatically determine whether one or more existing rules contained in the rule database 118 are applicable to the natural language text. If not, the rule generation engine 112 can generate a new rule that does apply to the natural language text.

Figure 5:
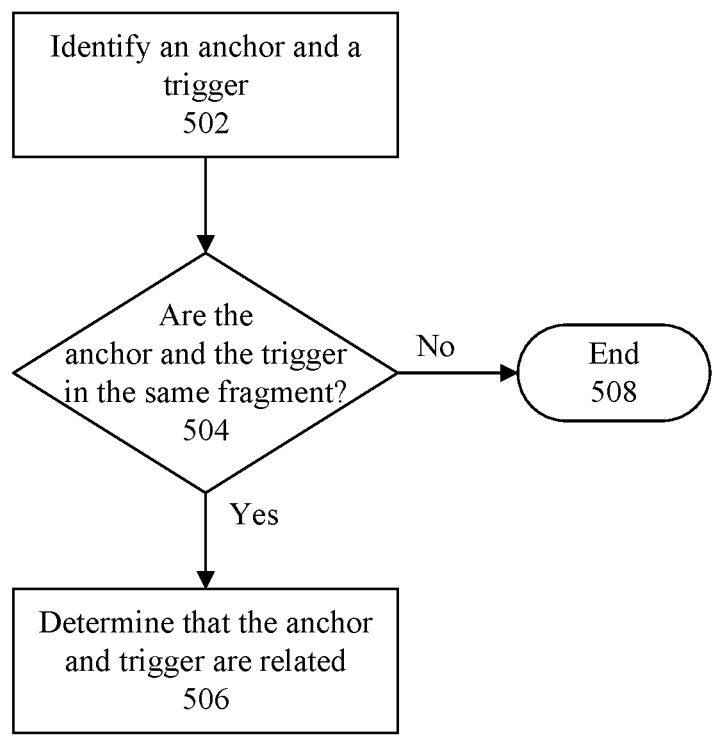
FIG. 5 is another flowchart representing a process defined by a heuristic for a natural language text processing rule.

FIG. 5 is another flowchart representing a process 500 defined by a heuristic for a natural language text processing rule which can be generated by the rule generation engine 112. The heuristic can be generated based on the previously described example for which the parse tree 400 is depicted in FIG. 4. The rule generation engine 112 can generate a rule based on the heuristic. At step 502, an anchor and a trigger are identified. At decision box 504, a determination is made as to whether the anchor and trigger are in the same sentence fragment. If so, at step 506 a determination can be made that the anchor and trigger are related. If not, the process can end at step 508.

Figure 6:
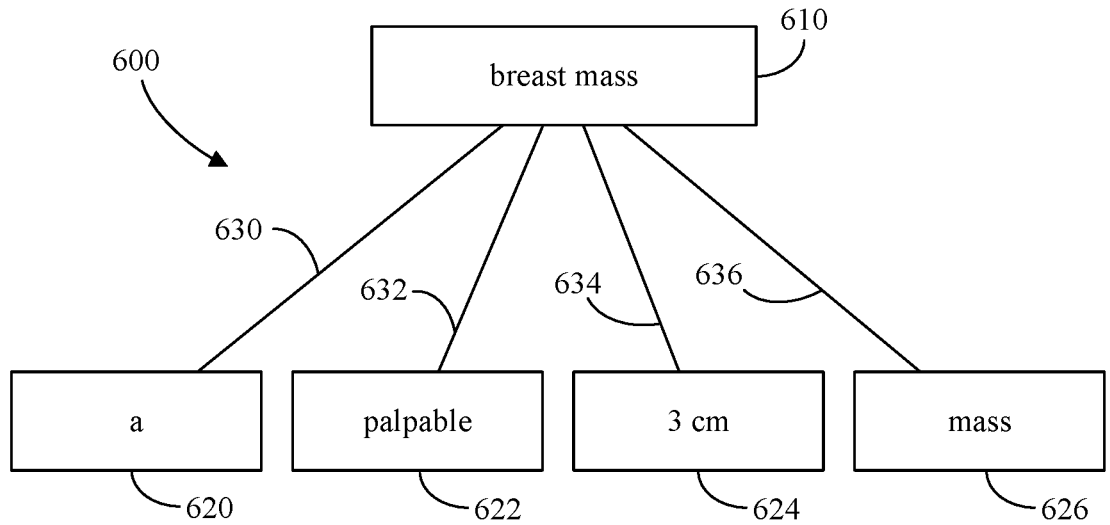
FIG. 6 depicts an example of a portion of a parse tree showing a parent element and elements that are siblings.

FIG. 6 depicts an example of a portion 600 of a parse tree showing a parent element 610 and elements 620, 622, 624, 626 that are siblings. The rule generation engine 112 can determine that the element 610 is a parent to elements 620-626 based on analyzing the structure of the parse tree. In illustration, the rule generation engine 112 can identify in the parse tree connectors 630, 632, 634, 636 connecting each of the respective elements 620-626 to the element 610, and thus determine that those elements 620-626 are immediate children of the element 610. Further, because each of the elements 620-626 are immediate children of the element 610, the rule generation engine 112 can determine that the elements 620-626 are siblings in the parse tree. The rule generation engine 112 can make such determinations during the analysis of the parse tree. The rule generation engine 112 can generate heuristics for generating at least one rule based on, at least in part, such determinations.

Figure 7:
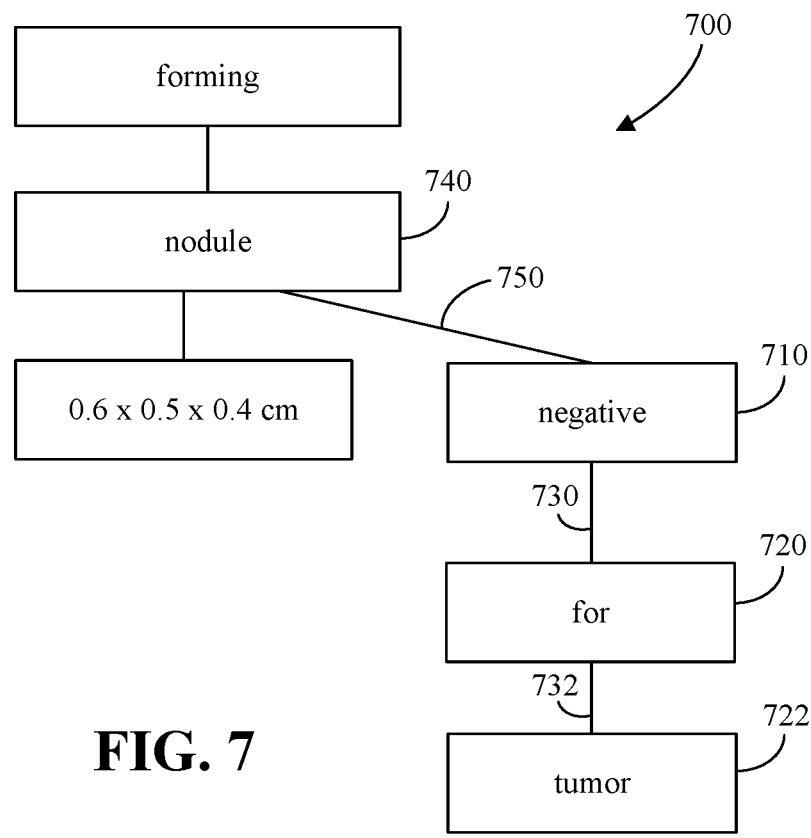
FIG. 7 depicts an example of a portion of a parse tree showing an element that is a negative trigger.

FIG. 7 depicts an example of a portion 700 of a parse tree showing an element 710 that is a negative trigger. The rule generation engine 112 can identify the term "negative," or a similar term, in the parse tree and classify that element 710 as a negative trigger. Further, the rule generation engine 112 can identify elements that are children of the element 710, such as an immediate child element 720 and a grandchild element 722, based on connectors 730, 732 that connect the respective elements 710, 720, 722 in the parse tree. Also, the rule generation engine 112 can determine that the element 710 is a child (e.g., immediate child) to the element 740 based on the connector 750 that connects the element 710 to the element 740. Based on the negative trigger element 710 and the semantic relationships between the elements 710, 720, 722, 740 indicated by the connectors 730, 732, 750, the rule generation engine 112 can determine that there is negative semantic relationship between the elements 720, 722 and the element 740. The rule generation engine 112 can generate heuristics for generating at least one rule based on, at least in part, such determination.

Figure 8:
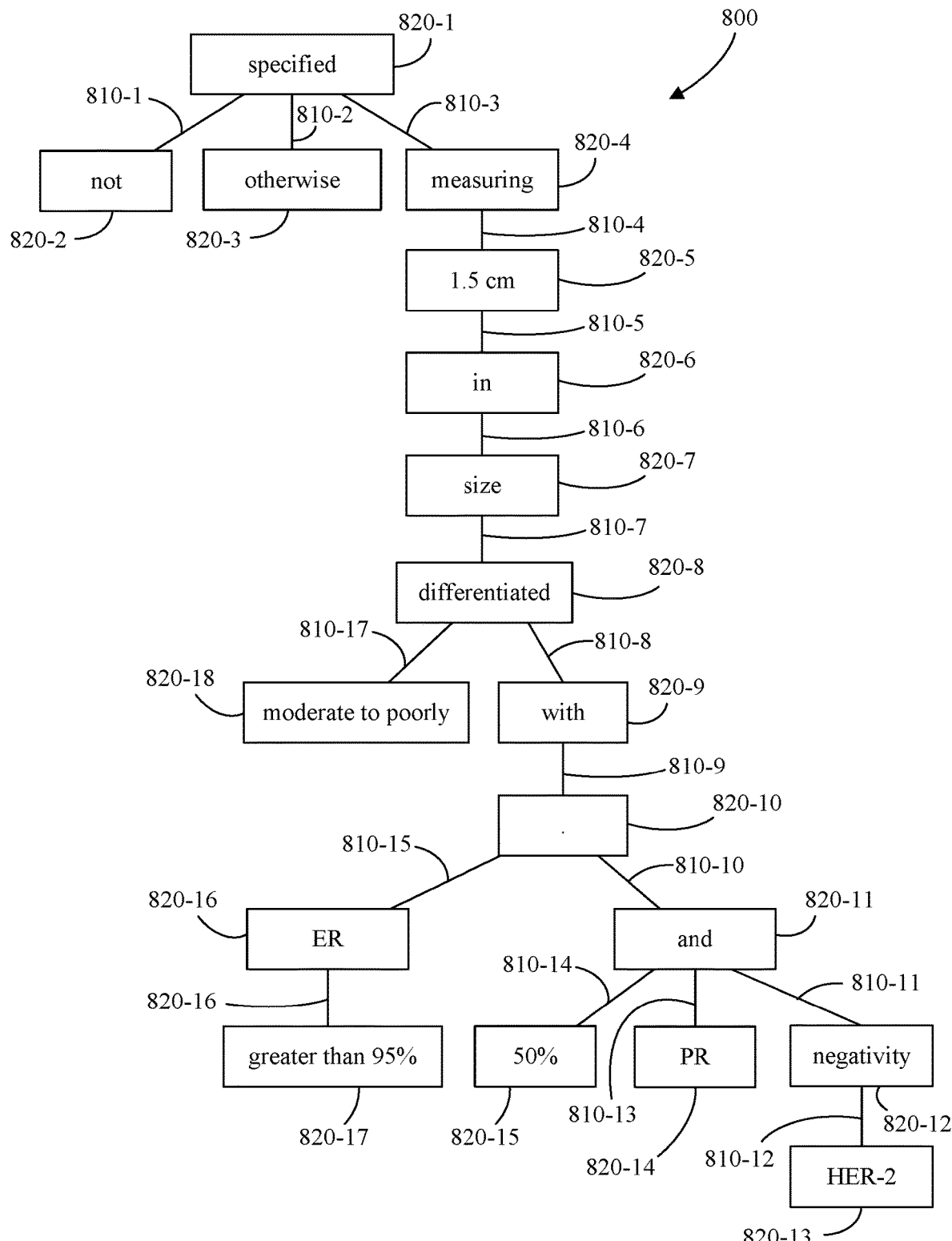
FIG. 8 depicts an example of a portion of a parse tree showing elements for which various path lengths may be determined.

FIG. 8 depicts an example of a portion 800 of a parse tree showing elements for which various path lengths may be determined. The rule generation engine 112 can identify the various connectors 810 that connect the various elements 820, thus indicating semantic relationships between the elements 820, and determine path lengths between the elements 820 based on the connectors 810. In illustration, the rule generation engine 112 can identify a single connector 810-1 connecting the element 820-1 to the element 820-2, and thus determine the path link between the element 820-1 and the and the element 820-2 equals one. Thus, the rule generation engine 112 can determine that the element 820-2 is an immediate child of the element 820-1. Similarly, the rule generation engine 112 can identify a single connector 810-2 connecting the element 820-1 to the element 820-3, identify a single connector 810-3 connecting the element 820-1 to the element 820-4 and, accordingly, determine that there is one path link between each of the respective elements 820-3, 820-4 and the element 820-1. Thus, the rule generation engine 112 can determine that the path length between the respective elements 820-3, 820-4 and the element 820-1 each are equal to one, and thus the elements 820-3 and 820-4 are immediate children of the element 820-1.

Further, the rule generation engine 112 can identify the connectors 810-3, 810-4 connecting the element 820-5 to the element 820-1 via the element 820-4, and thus determine that the path length between the element 820-1 and the element 820-5 is two. Accordingly, the rule generation engine 112 can determine that the element 820-5 is a child of the element 820-1, but not an immediate child. Instead, the rule generation engine 112 can determine that the element 820-5 is a grandchild of the element 820-1.

The rule generation engine 112 also can identify the connectors 810-3, 810-4, 810-5 connecting the element 820-6 to the element 820-1 via the elements 820-4, 820-5, and thus determine that the path length between the element 820-1 and the element 820-6 is three. Accordingly, the rule generation engine 112 can determine that the element 820-6 is a child of the element 820-1, but not an immediate child. Instead, the rule generation engine 112 can determine that the element 820-5 is a child of the element 820-1 with a path length of three.

The rule generation engine 112 can generate heuristics for generating at least one rule based on, at least in part, the determined path lengths. In an aspect of the present arrangements, the rule generation engine 112 need only determine path lengths between elements 820 in the parse tree that are anchors and triggers. As noted, the rule generation engine 112 can identify anchors and triggers based on the annotated text 134. In another aspect of the present arrangements, the rule generation engine can identify each of the elements 820-1, 820-2, 820-3, 820-4, 820-6, 820-7, 820-8, 820-9, 820-10, 820-11, 820-12, 820-13, 820-14, 820-15, 820-16, 820-17 and each of the connectors 810-1, 810-2, 810-3, 810-4, 810-6, 810-7, 810-8, 810-9, 810-10, 810-11, 810-12, 810-13, 810-14, 810-15, 810-16, and identify semantic relationships between each of the respective elements 820. The present arrangements are not limited in this regard, however.

In a non-limiting aspect of the present arrangements, rule generation engine 112 can consider only elements 820 for which the path lengths between those elements 820 are less than or equal to a threshold value when identifying the semantic relationships. For example, the rule generation engine 112 can determine that elements 820, for which the path length between those elements is greater than a first threshold value, have a level of semantic relationship below a second threshold value, and thus determine that those elements 820 do not correspond to one another in the context of generating a rule (e.g., those elements 820 are not semantically related in the context of generating the rule).

Figure 9A:
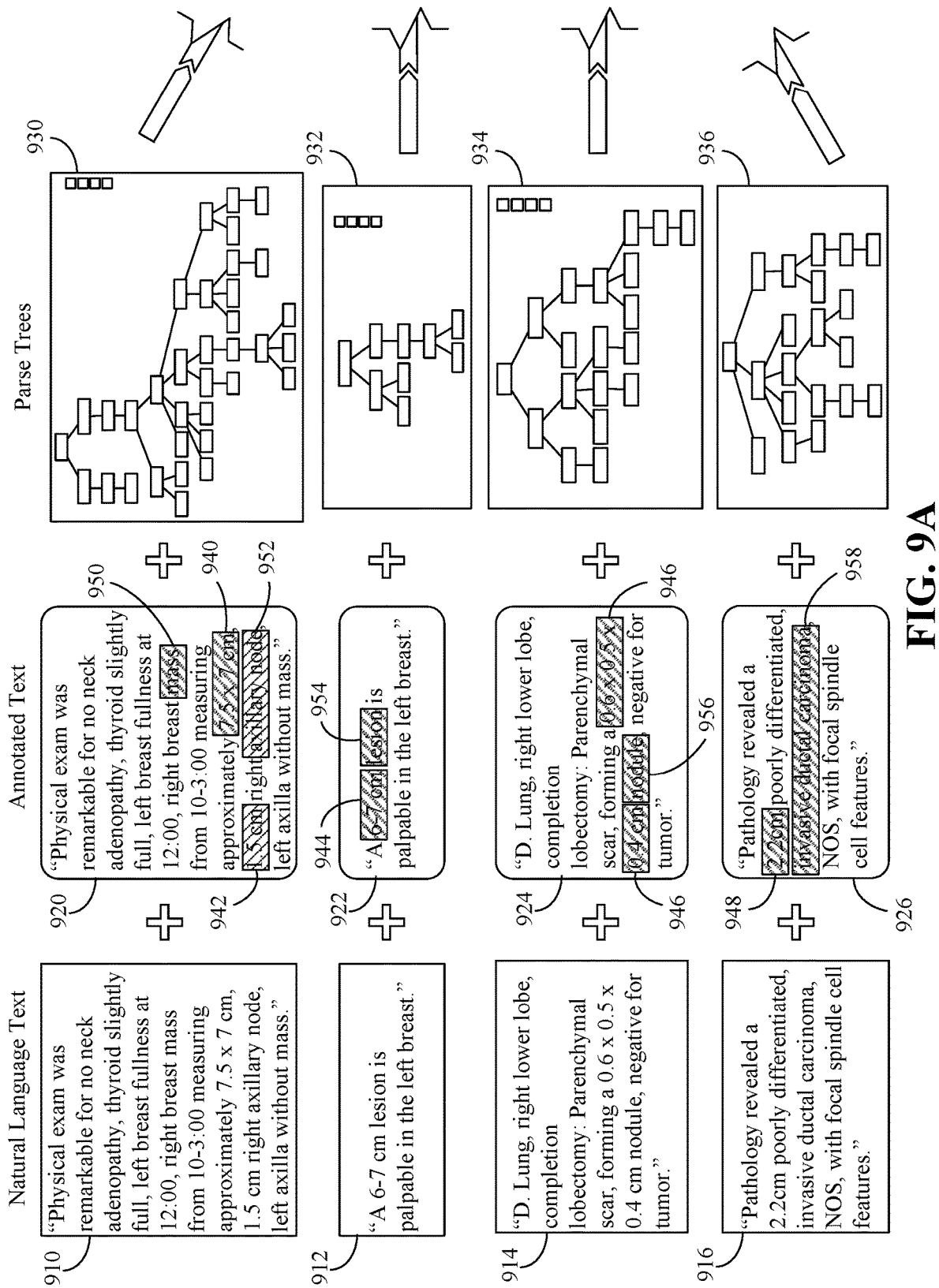
FIG. 9A depict examples of natural language text, annotated text and parse trees.

FIG. 9A depicts examples of natural language text 910, 912, 914, 916, and respective versions of the natural language text 910, 912, 914, 916 that are annotated in the form of annotated text 920, 922, 924, 926, respectively. The annotated text 920 can include annotations that indicate the anchor 940 corresponds to the trigger 950 and that indicate the anchor 942 corresponds to the trigger 952. Similarly, the annotated text 922 can include annotations that indicate the anchor 944 corresponds to the trigger 954, the annotated text 924 can include annotations that indicate the anchor 946 corresponds to the trigger 956, and the annotated text 926 can include annotations that indicate the anchor 948 corresponds to the trigger 958. Further, FIG. 9A depicts parse trees 930, 932, 934, 936 generated from the natural language text 910, 912, 914, 916, respectively. The rule generation engine 112 can process the natural language text 910-916, annotated text 920-926 and parse trees 930-936 to generate at least one rule.

Figure 9B:
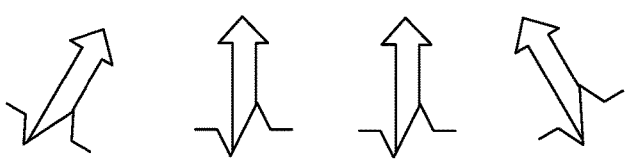
FIG. 9B depicts pseudo code for at least run rule generated from natural language text, annotated text and parse trees.

FIG. 9B depicts pseudo code 960 for computer program code that can be generated by the rule generation engine 112 to define at least one rule 962 generated from natural language text 910-916, annotated text 920-926 and parse trees 930-936. The rule generation engine 112 can generate heuristics for each rule based on processing the natural language text 910-916, annotated text 920-926 and parse trees 930-936, and generate the computer program code in accordance with the generated heuristics. The computer program code can include the rule(s) 962, trigger/anchor classifications 964 and processing instructions 966. The trigger/anchor classifications 964 can classify at least one trigger 970 and at least one anchor 972 identified in annotated text 920-926. The computer program code can be executed by at least one processing system, using at least one processor, to process natural language text and annotate the natural language text, for example by creating annotated text corresponding to the natural language text.

Figure 10:
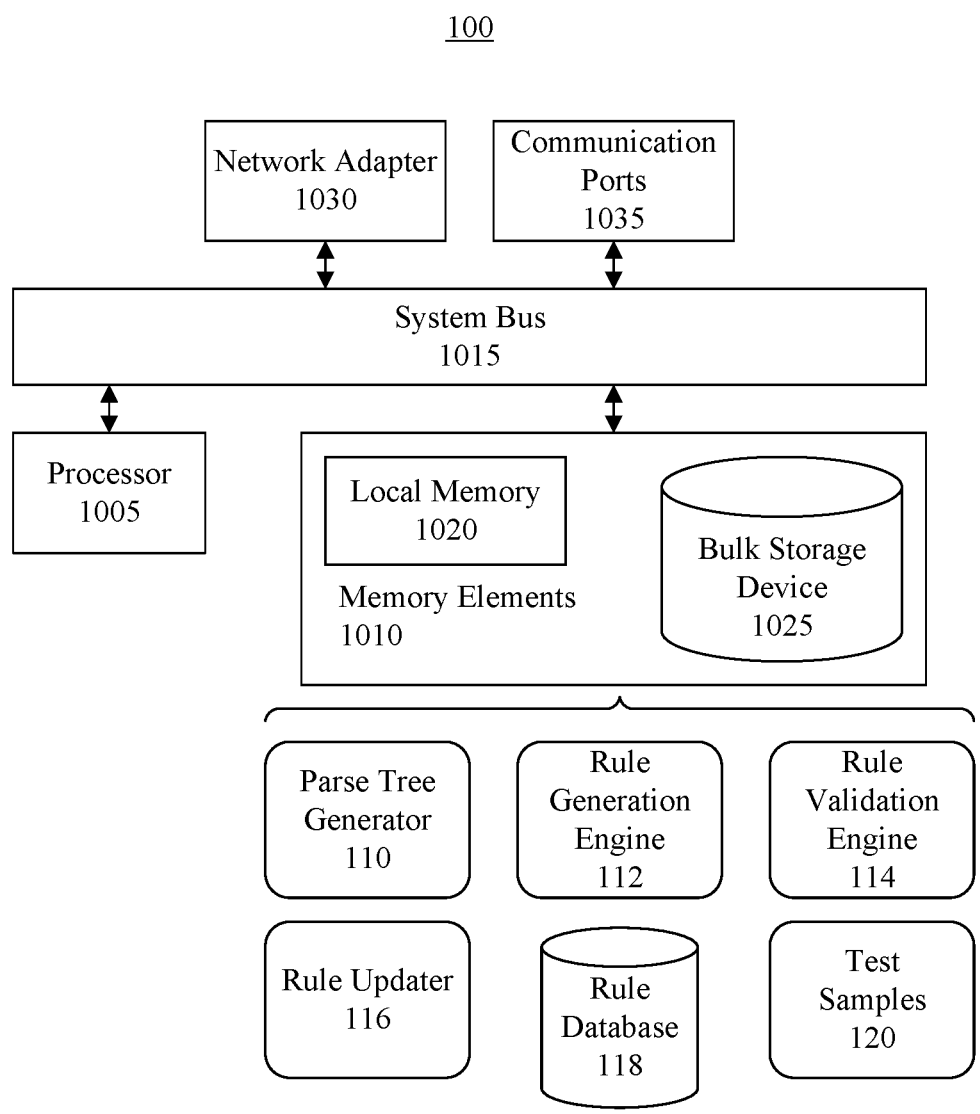
FIG. 10 is a block diagram illustrating an example of a data processing system.

FIG. 10 is a block diagram illustrating example architecture for the data processing system (hereinafter "system") 100 of FIG. 1. The system 100 can include at least one processor 1005 (e.g., a central processing unit) coupled to memory elements 1010 through a system bus 1015 or other suitable circuitry. As such, the system 100 can store program code within the memory elements 1010. The processor 1005 can execute the program code accessed from the memory elements 1010 via the system bus 1015. It should be appreciated that the system 100 can be implemented in the form of any system including a processor and memory that is capable of performing the functions and/or operations described within this specification. For example, the system 100 can be implemented as a server, a plurality of communicatively linked servers, a workstation, a desktop computer, a mobile computer, a laptop computer, a tablet computer, and so on.

The memory elements 1010 can include one or more physical memory devices such as, for example, local memory 1020 and one or more bulk storage devices 1025. Local memory 1020 refers to random access memory (RAM) or other non-persistent memory device(s) generally used during actual execution of the program code. The bulk storage device(s) 1025 can be implemented as a hard disk drive (HDD), solid state drive (SSD), or other persistent data storage device. The system 100 also can include one or more cache memories (not shown) that provide temporary storage of at least some program code in order to reduce the number of times program code must be retrieved from the bulk storage device 1025 during execution.

Input/output (I/O) devices such as a network adapter 1030 and communication ports 1035. The I/O devices can be coupled to the system 100 either directly or through intervening I/O controllers. The network adapter 1030 and/or communication ports 1035 can enable the system 100 to become coupled to other systems, computer systems, remote printers, and/or remote storage devices through intervening private or public networks. Modems, cable modems, transceivers, and Ethernet cards are examples of different types of network adapters 1030 that can be used with the system 100. Universal serial bus (USB) ports, IEEE-1394 ports, peripheral component interconnect express (PCIe) ports are examples of different types of communication ports 1035 that can be used with the system 100.

As pictured in FIG. 10, the memory elements 1010 can store the components of the system 100, namely the parse tree generator 110, the rule generation engine 112, the rule validation engine 114, the rule updater 116, the rule database 118 and the test samples 120. Being implemented in the form of executable program code, the parse tree generator 110, rule generation engine 112, rule validation engine 114 and rule updater 116 can be executed by the system 100 and, as such, can be considered part of the system 100. Moreover, the parse tree generator 110, rule generation engine 112, rule validation engine 114, rule updater 116, rule database 118 and test samples 120 are functional data structures that impart functionality when employed as part of the system 100. On a non-limiting arrangement, rather than including the parse tree generator 110 to generate parse trees, the system 100 can receive parse trees from another system. Rules generated by the system 100 can be output to, and stored within, the memory elements 1010, at least temporarily, and can be output to, and stored within, the rule database 118.

FIG. 11 is a flowchart illustrating an example of a method 1100 of generating a rule for annotating natural language text. The method can be implemented by the data processing system 100 of FIG. 1, for example by the rule generation engine 112, using at least one processor and memory.

At step 1102, the data processing system 100 can receive first natural language text and first annotated text, the first annotated text specifying at least one anchor and at least one trigger contained in the first natural language text and indicating a correspondence between the anchor and the trigger.

At step 1104, the data processing system 100 can process the first natural language text, the first annotated text and at least one parse tree generated from the first natural language text and, based on the processing, generate at least one natural language processing rule, the natural language processing rule configured to be executed by a processor to process at least a second natural language text At step 1106, the data processing system 100 can output the at least one natural language processing rule. For example, the rule generation system can store the at least one natural language processing rule to a rule database.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a first natural language text and a first annotated text, the first annotated text specifying at least one anchor and at least one trigger contained in the first natural language text and indicating a correspondence between the anchor and the trigger;
   processing, using a processor, the first natural language text, the first annotated text and at least one parse tree generated from the first natural language text and, based on the processing, generating at least one natural language processing rule, the natural language processing rule configured to be executed by at least a second processor to process at least a second natural language text; and
   outputting the at least one natural language processing rule.

2. The method of claim 1, wherein the natural language processing rule is configured to be executed by the second processor to identify at least one other anchor and at least one other trigger contained in the second natural language text.

3. The method of claim 2, wherein the natural language processing rule further is configured to be executed by the second processor to identify a correspondence between the at least one other anchor and the at least one other trigger contained in the second natural language text.

4. The method of claim 1, wherein the correspondence is a semantic relationship between the at least one anchor and the at least one trigger contained in the first natural language text.

5. The method of claim 1, further comprising:
generating at least one heuristic based on the processing the first natural language text, the first annotated text and the at least one parse tree;
wherein generating the at least one natural language processing rule comprises generating the at least one natural language processing rule in accordance with the at least one heuristic.

6. The method of claim 1, further comprising:
validating the natural language processing rule by applying the natural language processing rule to a plurality of natural language test samples for which anchor and trigger semantic relationships are known; and
generating validation results based on the validating.

7. The method of claim 1, further comprising:
generating the parse tree from the first natural language text.

8. A system, comprising:
a processor programmed to initiate executable operations comprising:
receiving a first natural language text and a first annotated text, the first annotated text specifying at least one anchor and at least one trigger contained in the first natural language text and indicating a correspondence between the anchor and the trigger;
processing the first natural language text, the first annotated text and at least one parse tree generated from the first natural language text and, based on the processing, generating at least one natural language processing rule, the natural language processing rule configured to be executed by at least a second processor to process at least a second natural language text; and
outputting the at least one natural language processing rule.

9. The system of claim 8, wherein the natural language processing rule is configured to be executed by the second processor to identify at least one other anchor and at least one other trigger contained in the second natural language text.

10. The system of claim 9, wherein the natural language processing rule further is configured to be executed by the second processor to identify a correspondence between the at least one other anchor and the at least one other trigger contained in the second natural language text.

11. The system of claim 8, wherein the correspondence is a semantic relationship between the at least one anchor and the at least one trigger contained in the first natural language text.

12. The system of claim 8, the executable operations further comprising:
generating at least one heuristic based on the processing the first natural language text, the first annotated text and the at least one parse tree;
wherein generating the at least one natural language processing rule comprises generating the at least one natural language processing rule in accordance with the at least one heuristic.

13. The system of claim 8, the executable operations further comprising:
validating the natural language processing rule by applying the natural language processing rule to a plurality of natural language test samples for which anchor and trigger semantic relationships are known; and
generating validation results based on the validating.

14. The system of claim 8, the executable operations further comprising:
generating the parse tree from the first natural language text.

15. A computer program product, comprising:
a computer readable storage medium having program code stored thereon, the program code executable by a data processing system comprising a first processor to initiate operations including:
receiving a first natural language text and a first annotated text, the first annotated text specifying at least one anchor and at least one trigger contained in the first natural language text and indicating a correspondence between the anchor and the trigger;
processing the first natural language text, the first annotated text and at least one parse tree generated from the first natural language text and, based on the processing, generating at least one natural language processing rule, the natural language processing rule configured to be executed by at least a second processor to process at least a second natural language text; and
outputting the at least one natural language processing rule.

16. The computer program product of claim 15, wherein the natural language processing rule is configured to be executed by the second processor to identify at least one other anchor and at least one other trigger contained in the second natural language text.

17. The computer program product of claim 16, wherein the natural language processing rule further is configured to be executed by the second processor to identify a correspondence between the at least one other anchor and the at least one other trigger contained in the second natural language text.

18. The computer program product of claim 15, wherein the correspondence is a semantic relationship between the at least one anchor and the at least one trigger contained in the first natural language text.

19. The computer program product of claim 15, wherein the program code is executable by the data processing system to initiate operations further comprising:
generating at least one heuristic based on the processing the first natural language text, the first annotated text and the at least one parse tree;
wherein generating the at least one natural language processing rule comprises generating the at least one natural language processing rule in accordance with the at least one heuristic.

20. The computer program product of claim 15, wherein the program code is executable by the data processing system to initiate operations further comprising:
validating the natural language processing rule by applying the natural language processing rule to a plurality of natural language test samples for which anchor and trigger semantic relationships are known; and
generating validation results based on the validating.

* * * * *